(12) United States Patent
Kiba et al.

(10) Patent No.: US 7,916,191 B2
(45) Date of Patent: Mar. 29, 2011

(54) IMAGE PROCESSING APPARATUS, METHOD, PROGRAM, AND RECORDING MEDIUM

(75) Inventors: Hiroyuki Kiba, Tokyo (JP); Nobuyuki Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 792 days.

(21) Appl. No.: 11/779,573

(22) Filed: Jul. 18, 2007

(65) Prior Publication Data
US 2008/0174683 A1 Jul. 24, 2008

(30) Foreign Application Priority Data
Jul. 26, 2006 (JP) .................. 2006-203702

(51) Int. Cl.
*H04N 9/64* (2006.01)
(52) U.S. Cl. ...... 348/246; 348/247; 348/241; 348/222.1
(58) Field of Classification Search .......... 348/246–247, 348/222.1, 241
See application file for complete search history.

(56) References Cited

U.S. PATENT DOCUMENTS
2005/0195297 A1* 9/2005 Kita ............................. 348/246

FOREIGN PATENT DOCUMENTS
| JP | 1993-130512 | 5/1993 |
| JP | 1999-205687 | 7/1999 |
| JP | 2000-244823 | 9/2000 |
| JP | 2004-228931 | 8/2004 |

OTHER PUBLICATIONS
Japanese Office Action dated Jun. 3, 2008 for Application No. 2006-203702.

* cited by examiner

*Primary Examiner* — David L Ometz
*Assistant Examiner* — Antoinette T Spinks
(74) *Attorney, Agent, or Firm* — SNR Denton US LLP

(57) ABSTRACT

An image processing apparatus includes: imaging means for capturing an image of an object of shooting; defective-position storing means for storing a position of a defective pixel of the imaging means; arraying means for arraying a plurality of pixels in a certain range of the vicinity of a noticed pixel of the image of the object of shooting output by the imaging means; when the noticed pixel is the defective pixel, prediction-pixel obtaining means for obtaining prediction pixels located at relative positions predetermined with respect to the noticed pixel and to be used for correcting the defective pixel out of the arrayed pixels; prediction-coefficient supplying means for supplying prediction coefficients corresponding to the prediction pixels; and calculation means for calculating a correction value of the noticed pixel by the sum of the products of the prediction pixels and the prediction coefficients.

10 Claims, 18 Drawing Sheets

| PIXEL-1 | PIXEL-2 | PIXEL-3 |
|---|---|---|
| R1: 78 | R2: 191 | R3: 220 |
| G1: 63 | G2: 176 | G3: 204 |
| B1: 63 | B2: 178 | B3: 209 |
| PIXEL-4 | DEFECTIVE PIXEL-0 | PIXEL-5 |
| R4: 121 | R0: 59 | R5: 207 |
| G4: 108 | G0: 250 | G5: 194 |
| B4: 110 | B0: 48 | B5: 193 |

FIG. 1

| PIXEL-1 | PIXEL-2 | PIXEL-3 |
|---|---|---|
| R1: 78 | R2: 191 | R3: 220 |
| G1: 63 | G2: 176 | G3: 204 |
| B1: 63 | B2: 178 | B3: 209 |
| PIXEL-4 | DEFECTIVE PIXEL-0 | PIXEL-5 |
| R4: 121 | R0: 59 | R5: 207 |
| G4: 108 | G0: 250 | G5: 194 |
| B4: 110 | B0: 48 | B5: 193 |

FIG. 9

| p11 W11 | p12 W12 | p13 W13 | p14 W14 | p15 W15 | p16 W16 | p17 W17 | p18 W18 | p19 W19 |
|---|---|---|---|---|---|---|---|---|
| p21 W21 | p22 W22 | p23 W23 | p24 W24 | p25 W25 | p26 W26 | p27 W27 | p28 W28 | p29 W29 |
| p31 W31 | p32 W32 | p33 W33 | p34 W34 | p35 W35 | p36 W36 | p37 W37 | p38 W38 | p39 W39 |
| p41 W41 | p42 W42 | p43 W43 | p44 W44 | p45 W45 | p46 W46 | p47 W47 | p48 W48 | p49 W49 |
| p51 W51 | p52 W52 | p53 W53 | p54 W54 | p55 | p56 W56 | p57 W57 | p58 W58 | p59 W59 |
| p61 W61 | p62 W62 | p63 W63 | p64 W64 | p65 W65 | p66 W66 | p67 W67 | p68 W68 | p69 W69 |
| p71 W71 | p72 W72 | p73 W73 | p74 W74 | p75 W75 | p76 W76 | p77 W77 | p78 W78 | p79 W79 |
| p81 W81 | p82 W82 | p83 W83 | p84 W84 | p85 W85 | p86 W86 | p87 W87 | p88 W88 | p89 W89 |
| p91 W91 | p92 W92 | p93 W93 | p94 W94 | p95 W95 | p96 W96 | p97 W97 | p98 W98 | p99 W99 |

| Gr | R | Gr | R | Gr | R | Gr | R | Gr |
|----|---|----|---|----|---|----|---|----|
| B | Gb | B | Gb | B | Gb | B | Gb | B |
| Gr | R | Gr | R | Gr | R | Gr | R | Gr |
| B | Gb | B | Gb | B | Gb | B | Gb | B |
| Gr | R | Gr | R | Gr | R | Gr | R | Gr |
| B | Gb | B | Gb | B | Gb | B | Gb | B |
| Gr | R | Gr | R | Gr | R | Gr | R | Gr |
| B | Gb | B | Gb | B | Gb | B | Gb | B |
| Gr | R | Gr | R | Gr | R | Gr | R | Gr |

| Gb | B | Gb | B | Gb | B | Gb | B | Gb |
| R | Gr | R | Gr | R | Gr | R | Gr | R |
| Gb | B | Gb | B | Gb | B | Gb | B | Gb |
| R | Gr | R | Gr | R | Gr | R | Gr | R |
| Gb | B | Gb | B | Gb | B | Gb | B | Gb |
| R | Gr | R | Gr | R | Gr | R | Gr | R |
| Gb | B | Gb | B | Gb | B | Gb | B | Gb |
| R | Gr | R | Gr | R | Gr | R | Gr | R |
| Gb | B | Gb | B | Gb | B | Gb | B | Gb |

| R | Gr | R | Gr | R | Gr | R | Gr | R |
|---|----|---|----|---|----|---|----|---|
| Gb | B | Gb | B | Gb | B | Gb | B | Gb |
| R | Gr | R | Gr | R | Gr | R | Gr | R |
| Gb | B | Gb | B | Gb | B | Gb | B | Gb |
| R | Gr | R | Gr | R | Gr | R | Gr | R |
| Gb | B | Gb | B | Gb | B | Gb | B | Gb |
| R | Gr | R | Gr | R | Gr | R | Gr | R |
| Gb | B | Gb | B | Gb | B | Gb | B | Gb |
| R | Gr | R | Gr | R | Gr | R | Gr | R |

| B | Gb | B | Gb | B | Gb | B | Gb | B |
| Gr | R | Gr | R | Gr | R | Gr | R | Gr |
| B | Gb | B | Gb | B | Gb | B | Gb | B |
| Gr | R | Gr | R | Gr | R | Gr | R | Gr |
| B | Gb | B | Gb | B | Gb | B | Gb | B |
| Gr | R | Gr | R | Gr | R | Gr | R | Gr |
| B | Gb | B | Gb | B | Gb | B | Gb | B |
| Gr | R | Gr | R | Gr | R | Gr | R | Gr |
| B | Gb | B | Gb | B | Gb | B | Gb | B |

FIG. 15

| p11 W11 | p12 W12 | p13 W13 | p14 W14 | p15 W15 | p16 W16 | p17 W17 | p18 W18 | p19 W19 |
|---|---|---|---|---|---|---|---|---|
| p21 W21 | p22 W22 | p23 W23 | p24 W24 | p25 W25 | p26 W26 | p27 W27 | p28 W28 | p29 W29 |
| p31 W31 | p32 W32 | p33 W33 | p34 W34 | p35 W35 | p36 W36 | p37 W37 | p38 W38 | p39 W39 |
| p41 W41 | p42 W42 | p43 W43 | p44 W44 | p45 W45 | p46 W46 | p47 W47 | p48 W48 | p49 W49 |
| p51 W51 | p52 W52 | p53 W53 | p54 W54 | p55 | p56 W56 | p57 W57 | p58 W58 | p59 W59 |
| p61 W61 | p62 W62 | p63 W63 | p64 W64 | p65 W65 | p66 W66 | p67 W67 | p68 W68 | p69 W69 |
| p71 W71 | p72 W72 | p73 W73 | p74 W74 | p75 W75 | p76 W76 | p77 W77 | p78 W78 | p79 W79 |
| p81 W81 | p82 W82 | p83 W83 | p84 W84 | p85 W85 | p86 W86 | p87 W87 | p88 W88 | p89 W89 |
| p91 W91 | p92 W92 | p93 W93 | p94 W94 | p95 W95 | p96 W96 | p97 W97 | p98 W98 | p99 W99 |

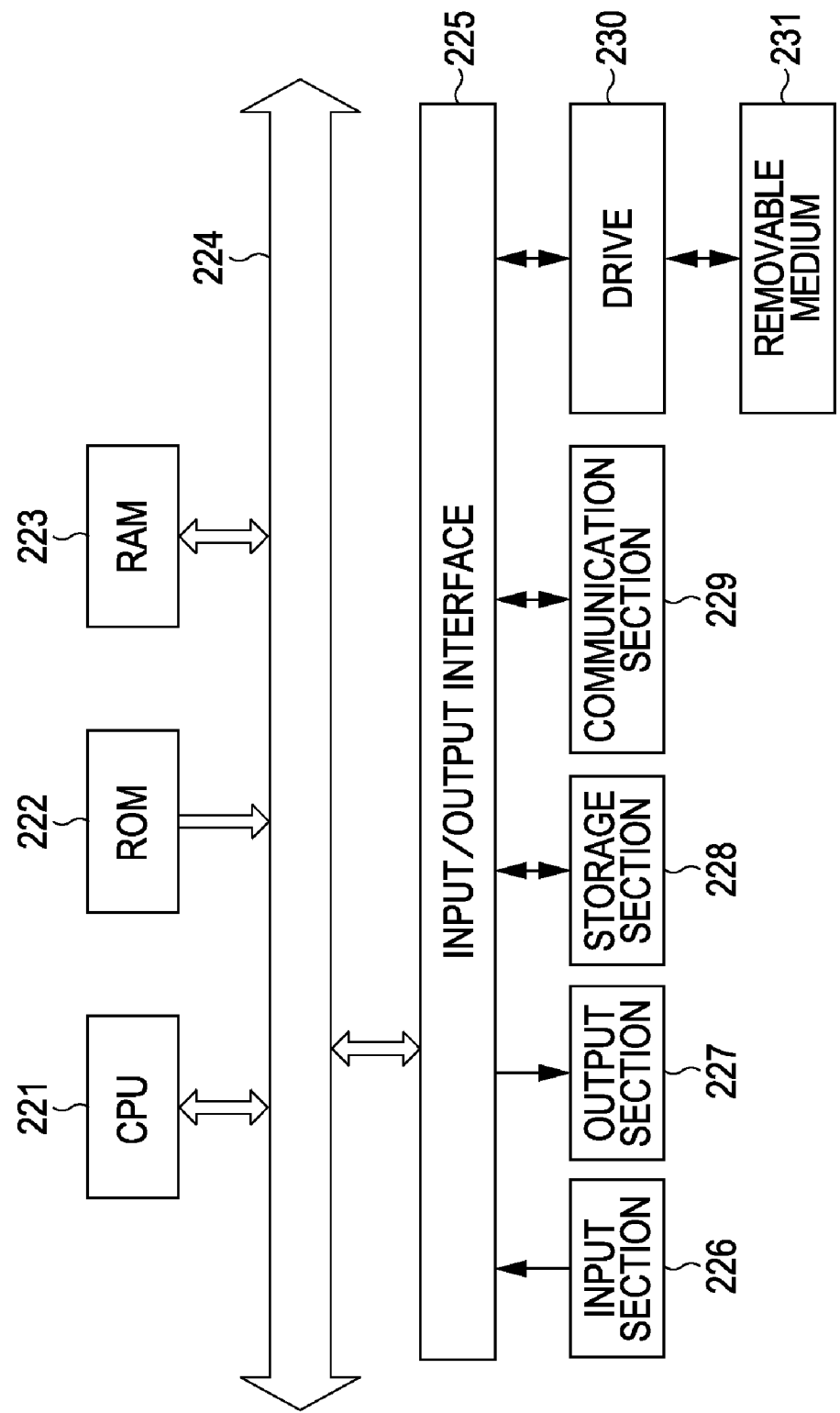

IMAGE PROCESSING APPARATUS, METHOD, PROGRAM, AND RECORDING MEDIUM

CROSS REFERENCES TO RELATED APPLICATIONS

The present invention contains subject matter related to Japanese Patent Application JP 2006-203702 filed in the Japanese Patent Office on Jul. 26, 2006, the entire contents of which are incorporated herein by reference.

BACKGROUND OF THE INVENTION

1. Field of the Invention

The present invention relates to an image processing apparatus, method, program, and recording medium. More particularly, the present invention relates to an image processing apparatus, method, program, and recording medium capable of correcting defective pixels in a line state or in a block state by a simple and small-sized configuration at a low cost.

2. Description of the Related Art

A solid-state imaging device, such as a CCD (Charge Coupled Device) image sensor, a CMOS (Complementary Metal Oxide Semiconductor) image sensor, etc., is used for a digital camera and a video camera.

These image sensors sometimes include a defective pixel which generates no electronic signals, or which outputs only a constant-level signal all the time because of a problem at the time of production, etc. The present applicant has proposed a method of correcting such a defective pixel before (for example, Japanese Unexamined Patent Application Publication No. 2004-228931).

A description will be given of the above-described proposed principle with reference to FIGS. 1 and 2. Assume that an imaging section includes three sheets of image sensors each of which is dedicated for red (R), green (G), and blue (B), and one pixel of a green image sensor among them is a defective pixel outputting only the value 250 all the time out of the values 0 to 255.

In such a case, a plurality of the other pixels adjacent to the defective pixel are provided for correcting the defective pixel. In the example in FIG. 1, the three pixels (pixel-1, pixel-2, and pixel-3) in the immediately adjacent upper line, and the pixels (pixel-4 and pixel-5) adjacent to the right and left in the same line are provided for the defective pixel-0. In this regard, in FIG. 1, numbers represent the values of individual colors. For example, the pixel value R0 of red of the defective pixel-0 is 59, the pixel value G0 of green is 250, and the pixel value B0 of blue is 48. Also, the pixel value R1 of red of the pixel-1 is 78, the pixel value G1 of green is 63, and the pixel value B1 of blue is 63.

First, a pixel that resembles the defective pixel is obtained. For colors (in this case, red and blue) other than the color (in this case, green) of a defective pixel out of the three colors, the sum of the absolute value of the differences with adjacent pixels is calculated, and the pixel corresponding to the minimum value is assumed to be the most similar pixel.

Specifically, as shown in FIG. 2, the difference dr in red is 19 (=78−59), and the difference db in blue is 15 (=63−48) between defective pixel-0 and pixel-1. The difference in red dr is 132 (=191−59), and the difference in blue db is 130 (=178−48) between the defective pixel-0 and pixel-2. The difference in red dr is 161 (=220−59), and the difference in blue db is 161 (=209−48) between the defective pixel-0 and pixel-3. The difference in red dr is 62 (=121−59), and the difference in blue db is 62 (=110−48) between the defective pixel-0 and pixel-4. The difference in red dr is 148 (=207−59), and the difference in blue db is 145 (=193−48) between the defective pixel-0 and pixel-5.

Accordingly, the sum of the absolute values of the difference in two colors for the pixels 1 to 5 are 34 (=19+15), 262 (=132+130), 322 (=161+161), 124 (=62+62), 293 (148+145), respectively. The minimum value thereof is 34 of pixel-1, and thus pixel-1 is the most similar pixel to the defective pixel-0.

Next, the difference is obtained between the green value of pixel-1, which is the most similar pixel to the defective pixel-0, and the average value of the sum of the absolute values of the differences. The obtained value becomes the value of the defective color of the defective pixel. Specifically, the value of green of pixel-1 is 63, and the average value of the sum of the difference absolute values is 17 (=34/2), and thus the corrected value becomes 46 (=63−17). Accordingly, the output of the three colors R, G, and B of the defective pixel becomes 59, 46, and 48, respectively.

In this manner, by correcting a defective pixel, it becomes possible not to discard an image sensor having a defective pixel and to effectively use it.

SUMMARY OF THE INVENTION

The occurrence of a defective pixel of a CCD image sensor or a CMOS image sensor is not limited to a single pixel. Defective pixels may sometimes occur for all the pixels in one horizontal or vertical line, or two-dimensional continuous pixels in a block state may become defective pixels because of the structure thereof. Even if the above-described proposal, in which a defective pixel is corrected using the other pixels adjacent to the defective pixel, is applied to an image sensor in which such huge defective pixels occur, it is difficult to correct defective pixels in a line state or in a block state. Also, in order to implement the proposal, it becomes necessary to perform a plurality of stages of calculations, such as a difference calculation, a calculation of the sum of difference absolute values, a calculation of the average value, a calculation of the minimum value. Accordingly, the circuit configuration for the correction becomes complicated and large scale, and thus the cost becomes high.

The present invention has been made in view of these circumstances. It is desirable to allow correcting defective pixels in a line state or in a block state by a simple and small-sized configuration at a low cost.

According to an embodiment of the present invention, there is provided an image processing apparatus including: imaging means for capturing an image of an object of shooting; defective-position storing means for storing a position of a defective pixel of the imaging means; arraying means for arraying a plurality of pixels in a certain range of the vicinity of a noticed pixel of the image of the object of shooting output by the imaging means; when the noticed pixel is the defective pixel, prediction-pixel obtaining means for obtaining prediction pixels located at relative positions predetermined with respect to the noticed pixel and to be used for correcting the defective pixel out of the arrayed pixels; prediction-coefficient supplying means for supplying prediction coefficients corresponding to the prediction pixels; and calculation means for calculating a correction value of the noticed pixel by the sum of the products of the prediction pixels and the prediction coefficients.

The embodiment of the present invention may further includes relating means for relating a pixel of an image of the object of shooting output by the imaging means to a flag indicating whether or not to be a target of calculation of the correction value of the noticed pixel, wherein the arraying means stores a predetermined number of lines of pixels related to a predetermined number of the flags.

In the embodiment of the present invention, the calculation means may calculate a correction value of the noticed pixel by further calculating the sum of the products of the flags with respect to the prediction pixels and the prediction coefficients.

In the embodiment of the present invention, the flag of the prediction pixel being the defective pixel may be excluded from a target of the calculation of the prediction pixel.

In the embodiment of the present invention, the flag of the prediction pixel having a different color from the noticed pixel may be excluded from a target of the calculation of the prediction pixel.

In the embodiment of the present invention, when all the prediction pixels of at least one quadrant of two quadrants in point symmetrical relation out of four quadrants based on the noticed pixel are the defective pixels, the calculation means does not calculate the correction value.

In the embodiment of the present invention, the prediction pixels may be divided into a plurality of groups in accordance with a distance from the noticed pixel, the calculation means may calculate the correction value using the prediction pixels in a group near the noticed pixel, and when the prediction pixels in a group near the noticed pixel are all the defective pixels, the calculation means may calculate the correction value using the prediction pixels in a group farther from the noticed pixel.

According to an embodiment of the present invention, there is provided a method of processing an image, a program, or a recording medium holding a program of an image processing apparatus including imaging means for capturing an image of an object of shooting, and defective-position storing means for storing a position of a defective pixel of the imaging means, the method comprising the steps of: arraying a plurality of pixels in a certain range of the vicinity of a noticed pixel of the image of the object of shooting output by the imaging means; when the noticed pixel is the defective pixel, obtaining prediction pixels located at relative positions predetermined with respect to the noticed pixel and to be used for correcting the defective pixel out of the arrayed pixels; supplying prediction coefficients corresponding to the prediction pixels; and calculating a correction value of the noticed pixel by the sum of the products of the prediction pixels and the prediction coefficients.

In an embodiment of the present invention, a plurality of pixels in a certain range of the vicinity of a noticed pixel of the image of the object of shooting are arrayed. Out of the arrayed pixels, prediction pixels located at relative positions predetermined with respect to the noticed pixel and to be used for correcting the defective pixel, which is the noticed pixel, are obtained. The correction value of the noticed pixel, which is the defective pixel, is obtained by the sum of the accumulations of the prediction pixels and the prediction coefficients corresponding to the prediction pixels.

As described above, by an embodiment of the present invention, it is possible to correct defective pixels in a line state or in a block state by a simple and small-sized configuration at a low cost.

BRIEF DESCRIPTION OF THE DRAWINGS

FIG. 1 is a diagram illustrating known correction of a defective pixel;

FIG. 9 is a diagram illustrating prediction pixels;

FIG. 11 is a diagram illustrating prediction pixels in a Bayer arrangement when the color of a noticed pixel is Gr;

FIG. 12 is a diagram illustrating prediction pixels in a Bayer arrangement when the color of a noticed pixel is Gb;

FIG. 13 is a diagram illustrating prediction pixels in a Bayer arrangement when the color of a noticed pixel is R;

FIG. 14 is a diagram illustrating prediction pixels in a Bayer arrangement when the color of a noticed pixel is B;

FIG. 15 is a diagram illustrating prediction pixels;

FIG. 18 is a block diagram illustrating the configuration of a personal computer to which the present invention is applied.

DESCRIPTION OF THE PREFERRED EMBODIMENTS

In the following, a description will be given of an embodiment of the present invention. The relationship between the constituent features of the present invention and the embodiment described in the specification or the drawings is exemplified as follows. This description is for confirming that an embodiment supporting the present invention is included in the specification or the drawings. Accordingly, if there is an embodiment included in the specification or the drawings, but not included here as an embodiment corresponding to the constituent features, the fact does not mean that the embodiment does not corresponds to the constituent features. On the contrary, if an embodiment is included here as constituent features corresponding to the present invention, the fact does not mean the embodiment does not correspond to the features other than the constituent features.

Figure 8:
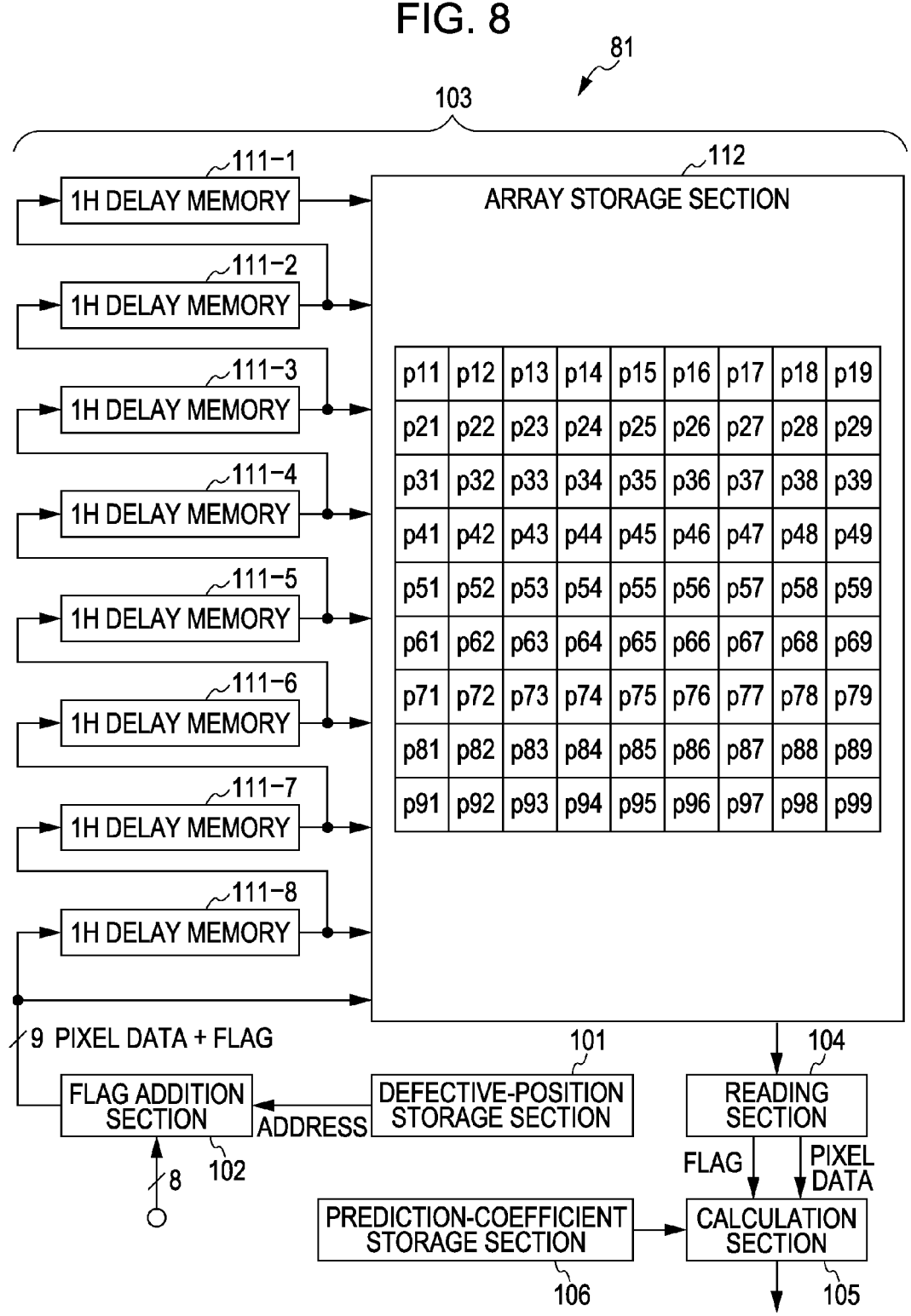
FIG. 8 is a block diagram illustrating the configuration of a defect correction section.

According to an embodiment of the present invention, there is provided an image processing apparatus (for example, the digital camera 1 in FIG. 3) including: imaging means (for example, the image sensor 13 in FIG. 3) for capturing an image of an object of shooting; defective-position storing means (for example, the nonvolatile memory 21 in FIG. 3) for storing a position of a defective pixel of the imaging means; arraying means (for example, the defect-map generation section 103 in FIG. 8) for arraying a plurality of pixels in a certain range of the vicinity of a noticed pixel of the image of the object of shooting output by the imaging means; when the noticed pixel is the defective pixel, prediction-pixel obtaining means (for example, the reading section 104 in FIG. 8) for obtaining prediction pixels located at relative positions predetermined with respect to the noticed pixel and to be used for correcting the defective pixel out of the arrayed pixels; prediction-coefficient supplying means (for example, the prediction-coefficient storage section 106 in FIG. 8) for supplying prediction coefficients corresponding to the prediction pixels; and calculation means (for example, the calculation section 105 in FIG. 8) for calculating a correction value of the noticed pixel by the sum of the product of the prediction pixels and the prediction coefficients.

The embodiment of the present invention may further includes relating means (for example, the flag addition section 102 in FIG. 8) for relating a pixel of an image of the object of shooting output by the imaging means to a flag indicating whether or not to be a target of calculation of the correction value of the noticed pixel, wherein the arraying means stores a predetermined number of lines of pixels related to a predetermined number of the flags.

According to an embodiment of the present invention, there is provided a method of processing an image, a program (for example, the defect correction method or program in FIG. 10), or a recording medium holding a program of an image processing apparatus including imaging means (for example, the image sensor 13 in FIG. 3) for capturing an image of an object of shooting, and defective-position storing means (for example, the nonvolatile memory 21 in FIG. 3) for storing a position of a defective pixel of the imaging means, the method comprising the steps of: arraying a plurality of pixels (for example, step S62 in FIG. 10) in a certain range of the vicinity of a noticed pixel of the image of the object of shooting output by the imaging means; when the noticed pixel is the defective pixel, obtaining prediction pixels (for example, step S65 in FIG. 10) located at relative positions predetermined with respect to the noticed pixel and to be used for the correction of the defective pixel out of the arrayed pixels; supplying prediction coefficients (for example, step S69 in FIG. 10) corresponding to the prediction pixels; and calculating a correction value (for example, step S71 in FIG. 10) of the noticed pixel by the sum of the products of the prediction pixels and the prediction coefficients.

In the following, a description will be given of embodiments of the present invention.

Figure 2:
FIG. 2 is a diagram illustrating known correction of a defective pixel.
Figure 3:
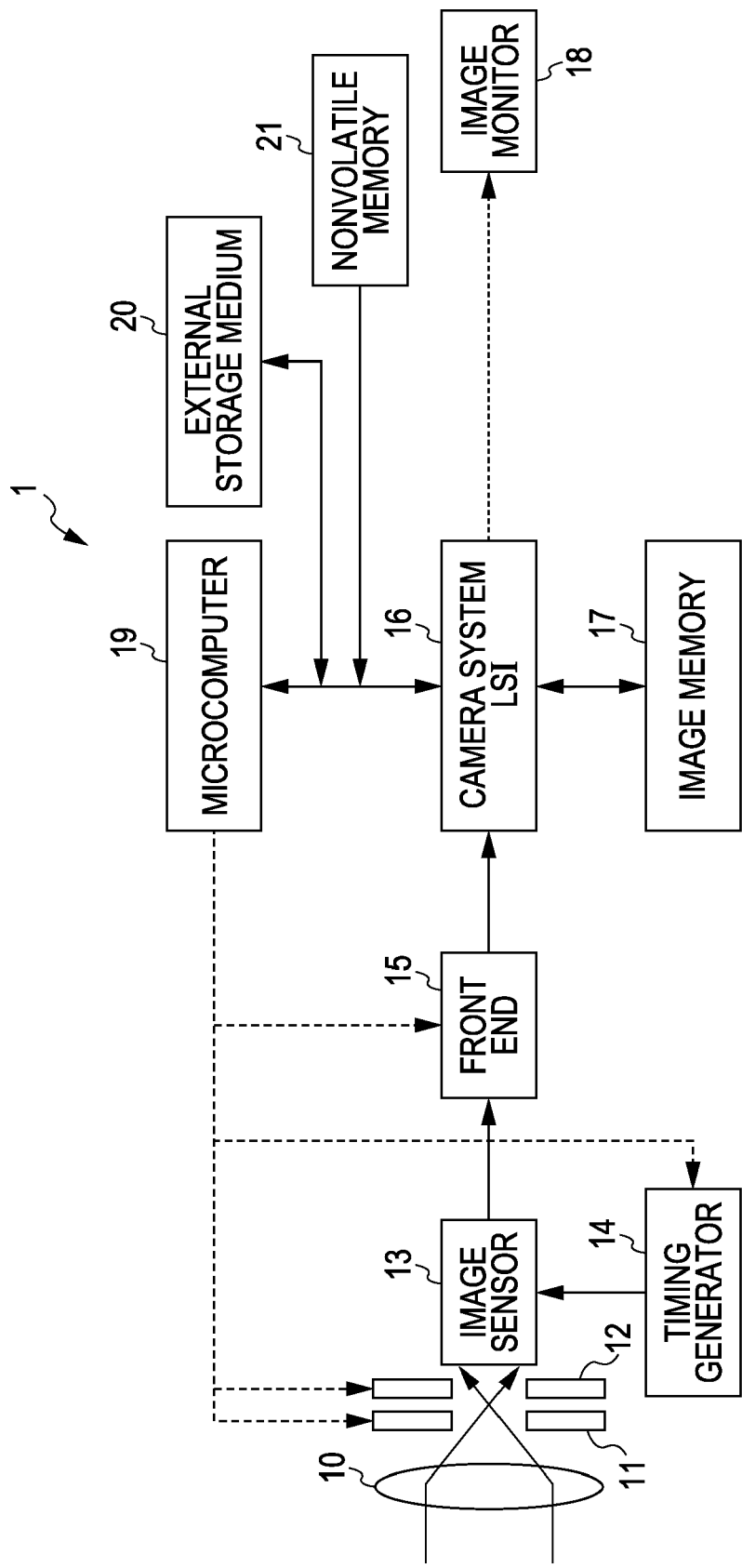
FIG. 3 is a block diagram illustrating the configuration of a digital camera according to an embodiment of the present invention.

FIG. 3 shows the configuration of a digital camera, namely an image processing apparatus according to an embodiment of the present invention. In this digital camera 1, the light of an object of shooting is condensed by a lens 10, enters into a single-plate image sensor 13 through an aperture 11 and an optical shutter 12. For example, an image sensor 13 including a CCD (Charge coupled Device) image sensor performs photoelectric conversion on the incident light, and outputs the signal to a front end 15.

A timing generator 14 performs the control of high-speed and low-speed electronic shutters in addition to the driving of the image sensor 13. The front end 15 performs processing, such as correlation square sampling for eliminating noise components, gain control, and A/D conversion, etc.

A camera system LSI (Large Scale Integration) 16 performs, on the image signal input from the front end 15, defect correction processing, gamma processing, correction processing for creating an image, color-space conversion processing, image-encode/decode processing into/out of a JPEG (Joint Photographic Experts Group) format, etc., in addition to processing, such as auto focus, auto exposure, auto white balance, etc. The image memory 17 is formed, for example, by SDRAM (Synchronous Dynamic Random Access Memory), and appropriately stores image data necessary for the camera system LSI 16 to perform processing. The image monitor 18 is formed by a LCD (Liquid Crystal Display), etc., and displays an image based on the image data output by the camera system LSI 16.

A nonvolatile memory 21 stores information on a defective pixel specific to the image sensor 13. That is to say, the image data output from the image sensor 13 is measured at the time of production, defect information, such as a defect type, a defect level, defect coordinates, is collected, and is stored into the nonvolatile memory 21. Accordingly, the image sensor 13 and the nonvolatile memory 21 storing the defect information thereof are used as a pair. The defect information read out from the nonvolatile memory 21 is transferred and stored to a defective-position storage section 101 (will be described later with reference to FIG. 8) in the camera system LSI 16 every time the power is turned on to the digital camera 1.

A microcomputer 19 performs the exposure control by the aperture 11 and the optical shutter 12, the timing control and the electronic-shutter control by the timing generator 14, the gain control by the front end 15, and the mode control and the parameter control by the camera system LSI 16, etc. An external storage medium 20 including a flash memory, etc., is removable from the outside by the user, and stores the image data captured by the image sensor 13.

Figure 4:
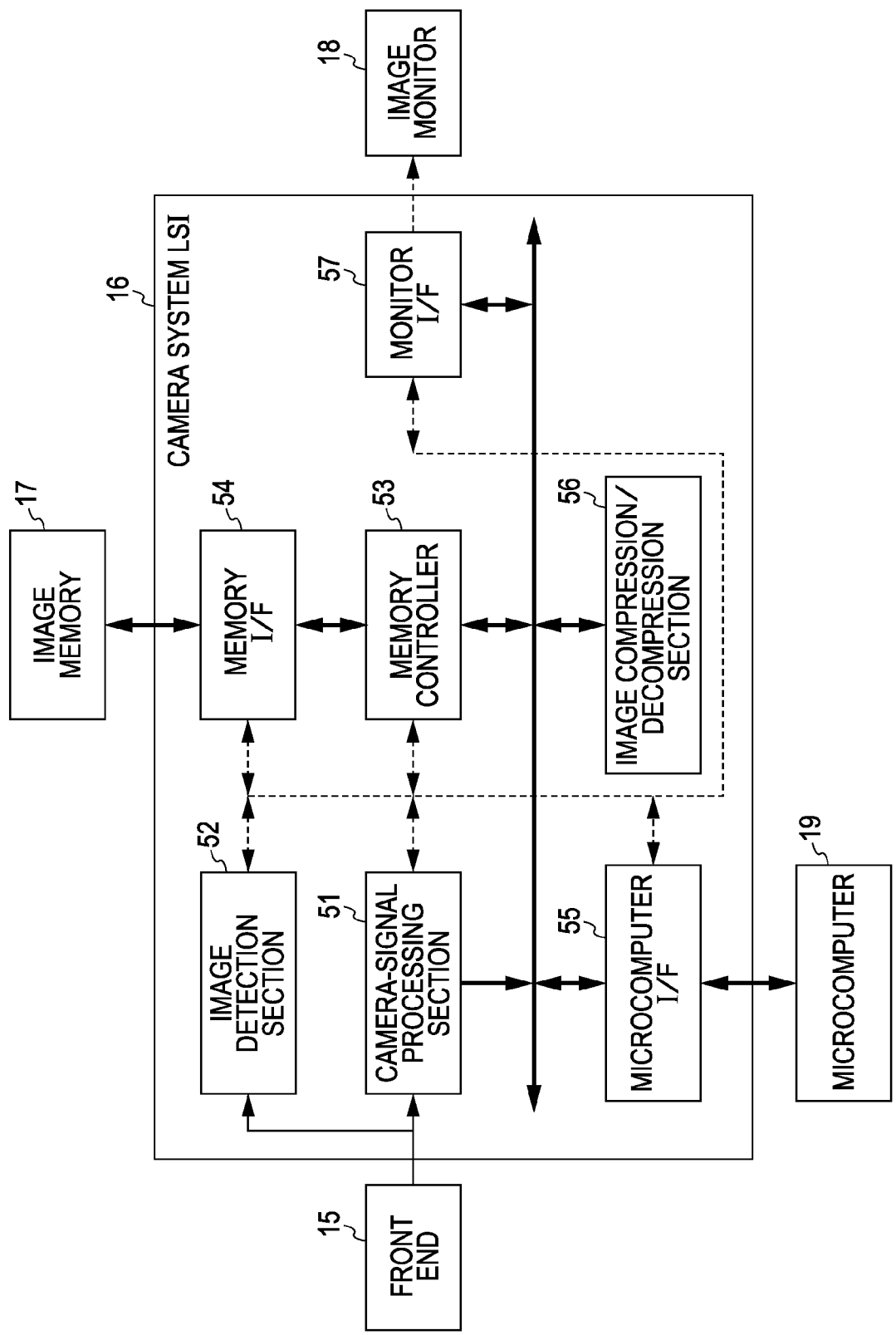
FIG. 4 is a block diagram illustrating the configuration of a camera-system LSI according to the embodiment.

FIG. 4 shows the internal configuration of the camera system LSI 16. An image detection section 52 performs the detection processing of a captured image by the camera, such as auto focus, auto exposure, auto white control, etc., on the basis of the output from the front end 15. A camera-signal processing section 51 performs, on the output of the front end 15, defect correction processing, gamma correction, correction processing for creating an image, color-space conversion processing, etc. An image compression/decompression section 56 performs image-encode/decode processing, etc., in JPEG format, etc.

A memory controller 53 performs data exchange between individual signal-processing blocks, or the signal-processing block and the image memory 17. A memory interface 54 exchanges image data with the image memory 17. A monitor interface 57 includes, for example an NTSC (National Television Standards Committee) encoder, and converts image data into NTSC-format data in order to display the image onto the image monitor 18. A microcomputer interface 55 exchanges control data and image data with the microcomputer 19 controlling the operation of the camera system LSI 16.

Figure 5:
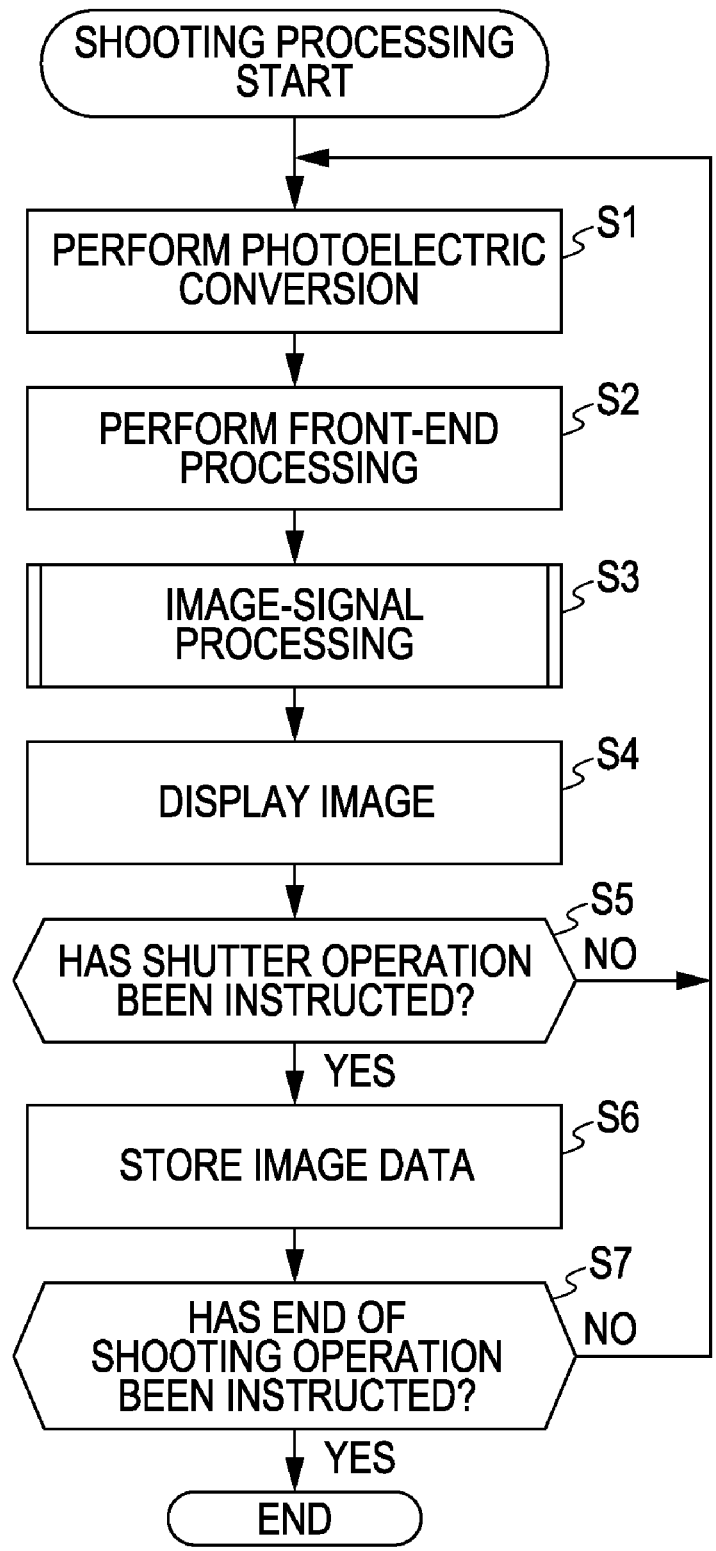
FIG. 5 is a flowchart illustrating shooting processing.

Next, a description will be given of the processing for capturing an image of a predetermined object of shooting, and storing the image data of the still image into the external storage medium 20 with reference to the flowchart of FIG. 5. In step S1, the image sensor 13 performs photoelectric conversion on the light from the object of shooting, which has been condensed by the lens 10 through the aperture 11 and the optical shutter 12, to output a signal.

In step S2, the front end 15 performs front end processing. That is to say, the front end 15 performs correlation square sampling on the image signal input from the image sensor 13 in order to eliminate noise components, performs the gain control thereof, and further performs A/D conversion to output the signal. In step S3, the camera system LSI 16 performs image signal processing. The details thereof will be described later with reference to the flowchart in FIG. 7. Thus, defect correction, auto focus, auto exposure, auto white balance adjustment, gamma correction, correction processing for creating an image, color-space conversion processing, and the like are performed.

In step S4, the image monitor 18 displays the image corresponding to the image signal output from the camera system LSI 16. Thereby, the user can confirm the image of the object of shooting.

In step S5, the microcomputer 19 determines whether the user has instructed to operate the shutter. If the shutter operation has not been instructed, the processing returns to step S1, and the subsequent processing is repeated.

If the shutter operation has been instructed, in step S6, the microcomputer 19 closes the optical shutter 12, and controls the image sensor 13 not to allow light to enter until the image signal immediately before is read out. The image compression/decompression section 56 encodes the image data of the still image of the object of shooting in JPEG format. The external storage medium 20 stores this image data. In step S7, the microcomputer 19 determines whether the user has instructed to end the shooting operation. If the end of the shooting operation has not been instructed, the processing returns to step S1, and the subsequent processing is repeated. If the end of the shooting operation has been instructed, the processing is terminated.

Figure 6:
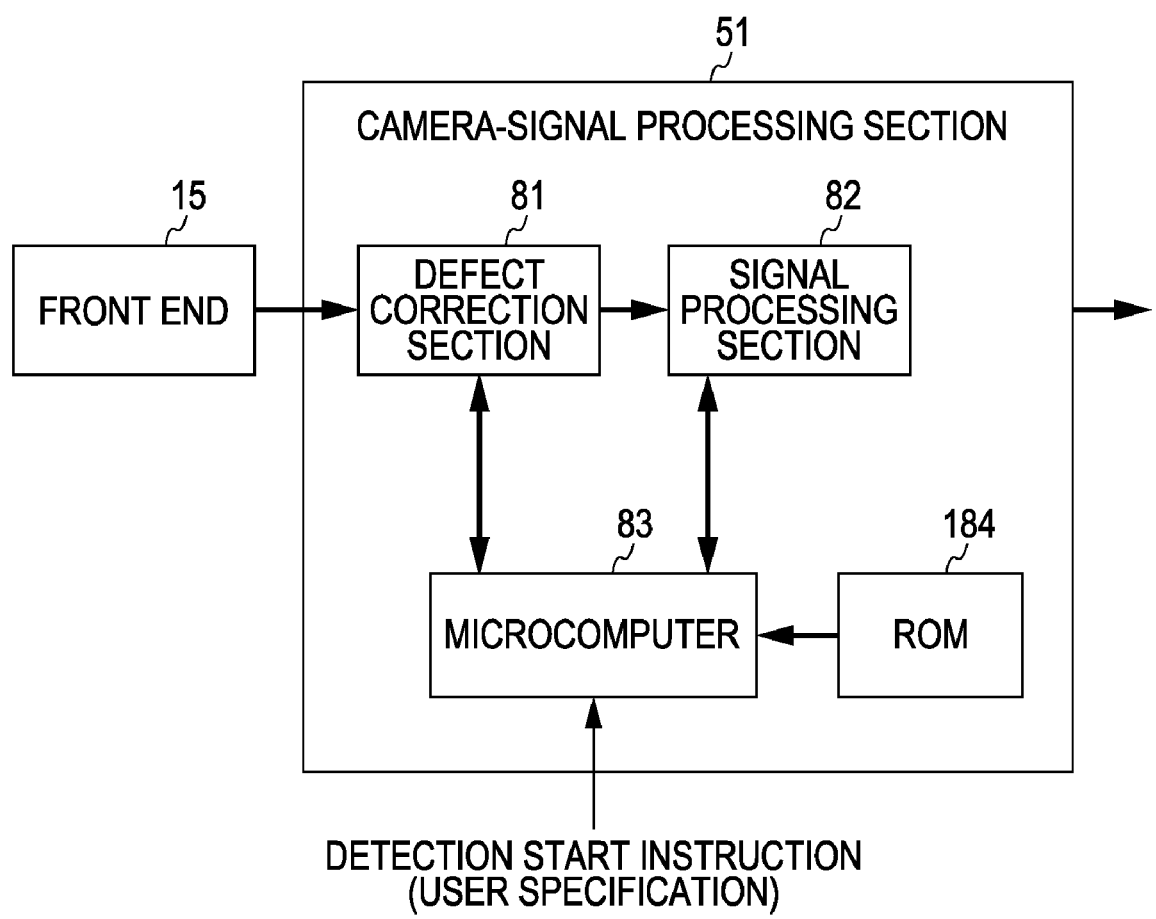
FIG. 6 is a block diagram illustrating the configuration of a camera-signal processing section.

Next, a detailed description will be given of the image signal processing in step S3. For this processing, the camera-signal processing section 51 is constituted as shown in FIG. 6.

The embodiment of the camera-signal processing section 51 includes a defect correction section 81, a signal processing section 82, a microcomputer 83, and a ROM (Read Only Memory) 84. The defect correction section 81 corrects the data of a defective pixel out of the image data input from the front end 15. The signal processing section 82 performs gamma correction, correction processing for creating an image, color-space conversion processing, etc. The microcomputer 83 controls the operation of the defect correction section 81 and the signal processing section 82. The ROM 84 stores parameters, programs, etc., necessary for the microcomputer 83 to perform various processing.

Next, a detailed description will be given of the image signal processing in step S3 in FIG. 5 with reference to the flowchart in FIG. 7.

In step S31, the defect correction section 81 performs the defect correction processing. The details thereof will be described with reference to the flowchart of FIG. 10. By this means, the pixel value of the defective pixel is corrected. In step S32, the image detection section 52 performs processing of Auto Focus (AF), Auto Exposure (AE), and Auto White balance (AW). Specifically, the position of the lens 10 is adjusted by the motor not shown in the figure in order to get a clear captured image. Also, in order to get optimum brightness of the image, the opening of the aperture 11 is subjected to control adjustment by the motor not shown. Furthermore, the level of each of the color signals R, G, and B is adjusted to the level at which proper white can be expressed.

In step S33, the signal processing section 82 corrects the value of the input image signal in accordance with the gamma curve. In step S34, the signal processing section 82 performs the correction processing for creating an image. For example, the correction processing, such as edge enhancement, which is necessary for giving a better view of the image, is performed. In step S35, the signal processing section 82 performs color-space conversion processing. For example, the signal processing section 82 outputs the RGB signal without change, or multiplies the RGB signal by a predetermined conversion matrix provided in advance, and format converts the signal into a signal such as YUV to output the signal.

In the image sensor 13, a defective pixel, such as a pixel which is not sensitive to light, or a pixel which holds charge all the time, etc., may be formed in the process at production time. In order to correct the pixel value of such a defective pixel, the defect correction section 81 is constituted as shown in FIG. 8.

The embodiment of the defect correction section 81 in FIG. 8 includes a defective-position storage section 101, a flag addition section 102, a defect-map creation section 103, a reading section 104, a calculation section 105, and a prediction-coefficient storage section 106.

The defect-map creation section 103 includes 1H delay memories 111-1 to 111-8, and an array storage section 112.

The defective-position storage section 101 includes, for example a RAM (Random Access Memory), etc., and stores defect information, such as an address, color, etc., of the defective pixel out of the pixels held by the image sensor 13, which has been transferred from the nonvolatile memory 21.

The flag addition section 102 adds a flag indicating whether a defective pixel or not to each pixel of the image data. This flag is also a flag indicating whether or not targeted for the calculation of the correction value of the noticed pixel. Specifically, assuming that each one pixel of one color supplied from the front end 15 is, for example 8-bit pixel data, the flag addition section 102 adds a 1-bit flag that is "0" if the pixel is a defective pixel, and adds a flag that is "1" if the pixel is not a defective pixel on the basis of the address supplied from the defective-position storage section 101, and thus producing the image data with a flag, which is 9 bits in total.

Each of the 1H delay memories 111-8 to 111-1 gives a delay of time corresponding to one line (1H) to 9-bit image data with a flag with respect to each one pixel of one color output by the flag addition section 102, and then outputs the data to the subsequent stage in sequence. As a result, at the timing when the flag addition section 102 outputs one-line of image data with a flag to the array storage section 112, each of the 1H delay memories 111-8 to 111-1 supplies consecutive upper eight-line of image data with a flag to the array storage section 112. That is to say, an array having consecutive 9 lines and 9 pieces of image data with a flag per one line, P11 to P99, is created in the array storage section 112. In other words, a defect map including 9×9 pieces of image data P11 to P99 with a flag in a certain range of the vicinity centered about the noticed pixel p55 is created in the array storage section 112.

When the noticed pixel p55 is a defective pixel, the prediction-coefficient storage section 106 stores prediction coefficients to be used for the calculation of the correction values. In the present embodiment, as shown in FIG. 9, when prediction coefficients w11 to w99 corresponding to the image data P11 to P99 with a flag, respectively are assumed, three groups of pixels, namely 36 pixels in total, are used for prediction pixels. The first group includes 8 pixels p53, p64, p75, p66, p57, p46, p35, and p44, which are disposed at nearly a certain distance from the center, the noticed pixel p55. The second group includes 16 pixels p51, p62, p73, p84, p95, p86, p77, p68, p59, p48, p37, p26, p15, p24, p33 and p42, which are disposed at nearly a further distance from the center, the noticed pixel p55. The third group includes 12 pixels p71, p82, p93, p97, p88, p79, p39, p28, p17, p13, p22 and p31, which are disposed at nearly a still further distance from the center, the noticed pixel p55.

Thus, three groups of prediction coefficients corresponding to these pixels, namely 36 prediction coefficients in total, are stored. The first group includes 8 prediction coefficients w53, w64, w75, w66, w57, w46, w35, and w44, which are corresponding to the prediction pixels of the first group, respectively. The second group includes 16 prediction coefficients w51, w62, w73, w84, w95, w86, w77, w68, w59, w48, w37, w26, w15, w24, w33 and w42, which are corresponding to the prediction pixels of the second group, respectively. The third group includes 12 prediction coefficients w71, w82, w93, w97, w88, w79, w39, w28, w17, w13, w22 and w31, which are corresponding to the prediction pixels of the third group, respectively.

The reading section 104 reads prediction pixels from the 9×9 pieces of image data with a flag stored in the array storage section 112, separates the image data and the flag, and outputs them to the calculation section 105. The calculation section 105 determines whether the prediction coefficient is of a defective pixel on the basis of the flag. If it is a defective pixel, the calculation section 105 eliminates the pixel from the prediction pixels, and calculates the correction value of the noticed pixel, which is a defective pixel by the sum of the products of the remaining prediction pixels and the corresponding pixels. The corrected pixel value is output to the subsequent-stage signal processing section 82.

Figure 10:
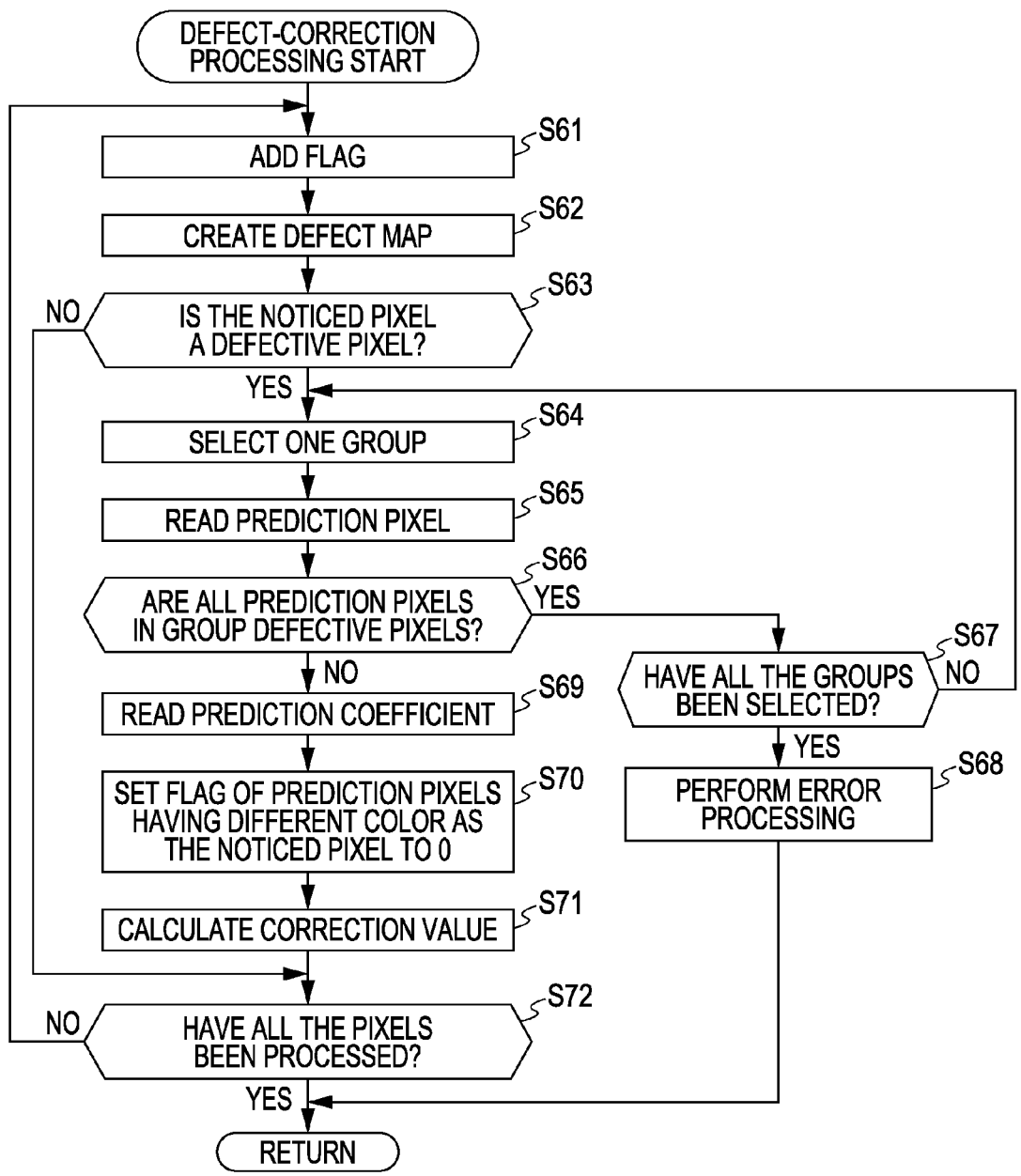
FIG. 10 is a flowchart illustrating defect-correction processing.

Next, a detailed description will be given of the defect correction processing in step S31 in FIG. 7 with reference to the flowchart in FIG. 10.

In step S61, the flag addition section 102 adds a flag to the pixel data supplied from the front end 15. Specifically, the flag addition section 102 determines whether each pixel supplied from the front end 15 is a defective pixel on the basis of the address stored in the defective-position storage section 101. When the front end 15 expresses one pixel of one color by 8 bits, if a pixel is a defective pixel, 1-bit flag "0" is added. If a pixel is not a defective pixel (if it is a normal pixel), 1-bit flag "1" is added. Thus, one pixel is output as 9-bit image data including a flag.

In step S62, the defect-map creation section 103 creates a defect map. That is to say, the image data with a flag output by the flag addition section 102 is delayed for one line by the 1H delay memory 111-8, and is output to the subsequent-stage 1H delay memory 111-7. The 1H delay memory 111-7 delays the input image data with a flag for one line, and outputs the image data to the subsequent-stage 1H delay memory 111-6. In the following, in the same manner, the subsequent 1H delay memories 111-6 to 111-1 perform the same delay processing, and supply the output of each of the 1H delay memories 111-8 to 111-1 to the array storage section 112 together with the output of the flag addition section 102.

As a result, at the timing when the flag addition section 102 outputs the pixel data of the lowermost line to the array storage section 112, the 1H delay memories 111-8 to 111-1 output the pixel data of each one line above, respectively. Thus, the array storage section 112 holds an array including 9×9 pieces of pixel data P11 to P99 as shown in FIG. 8. That is to say, the array storage section 112 stores 9×9 pieces of image data with a flag of a certain area of one screen, and creates a defect map.

In step S63, the reading section 104 reads the noticed pixel, and determines whether the noticed pixel is a defective pixel. Specifically, if the flag of the noticed pixel p55 is "0", the pixel is determined to be a defective pixel. If the flag is "1", the pixel is determined not to be a defective pixel (a normal pixel). If the noticed pixel p55 is a defective pixel, in step S64, the reading section 104 selects one group in ascending order of the distance from the noticed pixel p55 out of the three groups. In this case, the first group, which is the nearest from the noticed pixel p55, is selected.

In step S65, the reading section 104 reads the prediction coefficients in the group. In this case, the first-group prediction coefficients w53, w64, w75, w66, w57, w46, w35, and w44, which are nearest from the noticed pixel P55 are read and supplied to the calculation section 105. In step S66, the calculation section 105 determines whether all the prediction pixels in the group are defective pixels. In this case, the pixel is also determined to be a defective pixel if the flag is "0", and the pixel is determined not to be a defective pixel (determined to be a normal pixel) if the flag is "1".

When all the prediction pixels in the group are defective pixels, in step S67, the reading section 104 determines whether all the groups have been selected. If there is a group not yet selected, the processing returns to step S64, and the reading section 104 selects the group which is near the defective pixel next to the previous one. In the present case, the second group is selected. In step S65, the reading section 104 reads the prediction coefficients of the group. In the present case, the second-group prediction coefficients w51, w62, w73, w84, w95, w86, w77, w68, w59, w48, w37, w26, w15, w24, w33 and w42 are read, and are supplied to the calculation section 105. In step S66, the calculation section 64 determines again whether all the prediction pixels in the group are defective pixels.

When all the prediction pixels in the group are also defective pixels in the second group, in step S67, the reading section 104 determines whether all the groups have been selected. If there is a group not yet selected, the processing returns to step S64, and the reading section 104 selects the group which is near the defective pixel next to the previous one. In the present case, the third group is selected. In step S65, the reading section 104 reads the prediction coefficients of the group. In the present case, the third-group prediction coefficients w71, w82, w93, w97, w88, w79, w39, w28, w17, w13, w22 and w31 are read, and are supplied to the calculation section 105. In step S66, the calculation section 64 determines again whether all the prediction pixels in the group are defective pixels.

When all the prediction pixels in the group are also defective pixels in the third group, in step S67, the reading section 104 determines whether all the groups have been selected. In the present case, all the three groups have already been selected, and thus, in step S68, the calculation section 105 performs error processing. Specifically, for example a message stating that the correction processing is not allowed to be performed is created, and the message is displayed onto the image monitor 18.

In step S66, if a determination is made that all the prediction pixels in the group are not defective pixels (if there is at least one normal pixel in the group), in step S69, the reading section 104 reads the prediction coefficients stored in the prediction-coefficient storage section 106 corresponding to the prediction pixels, which are not defective pixels.

In this manner, it is possible to correct the noticed pixel to a value near the original by setting the pixels of the group closer to the noticed pixel in distance as prediction pixels.

In step S70, the calculation section 105 sets the flag of the prediction pixels having a different color from the noticed pixel to "0". The image sensor 13 is a single-plate image sensor, and, as shown FIGS. 11 to 14, has a configuration of a Bayer arrangement in which a green pixel Gr (which means a green pixel in an R-pixel row) is disposed at the immediate left of an R pixel, a blue pixel B is disposed at the lower left, and a green pixel Gb (which means a green pixel in an B-pixel row) is disposed at immediately below. Accordingly, when the noticed pixel is a green pixel Gr or Gb, as shown in FIG. 11 or FIG. 12, the same green pixels as the noticed pixel are disposed at the positions of all the prediction pixels shown in FIG. 9, and thus it is possible to calculate the correction value of the noticed pixel using these prediction pixels.

In contrast, when the noticed pixel is a red pixel R or a blue pixel B, as shown in FIG. 13 or FIG. 14, the same red or blue pixel as the noticed pixel out of the prediction pixels shown in FIG. 9 are only the prediction pixels shown in FIG. 15. That is to say, the prediction pixels in the same line as the noticed pixel, the prediction pixels in two lines or four lines above, and the prediction pixels in two lines or four lines below are the pixels having the same color as the noticed pixel.

In contrast, the prediction pixels in one line or three lines above, and the prediction pixels in one line or three lines below are the pixels having the different color as the noticed pixel. Thus, if these prediction pixels are used for calculating the correction value of the noticed pixel, the noticed pixel is corrected to an erroneous value. Accordingly, the flags of the pixels having different color are set to "0", which indicate the exclusion of the calculation of the correction value in the same manner as the case of a defective pixel. By this means, in the calculation of the correction value in Expression (1) in step S71 described below, these prediction pixels are virtually excluded from the target of the prediction pixels. Thus, the noticed pixel is prevented from being corrected to an erroneous value. This flag can be a different flag from the flag indicating a defective pixel, which is added in step S61. However, by sharing the flag, it is possible to simplify the calculation of Expression (1) described below.

In step S71, the calculation section 105 calculates a correction value. Specifically, the sum of the products of the prediction pixel pi and the prediction coefficient $w_i$ is calculated by the following Expression (1) to obtain the correction value P55. In Expression (1), $f_i$ represents the flag of the prediction pixels, and i represents the number of the prediction pixel 1 to N (N represents the number of prediction pixels in the group).

$$P55=\Sigma f_i \times w_i \times p_i / \Sigma f_i \times w_i \quad (1)$$

In this regard, the value of the prediction coefficient $w_i$ can be set to a higher value as the distance from the noticed pixel is smaller. Roughly, the prediction coefficients in the same group can be set to the same value. The prediction coefficients of the first group can be set to the highest value, the prediction coefficients of the second group can be set to a lower value than that, and the prediction coefficients of the third group can be set to the lowest value. Alternatively, to be precise, the distance from the noticed pixel differs for each prediction pixel even in the same group. Thus, for example, in the first group, the prediction coefficients w64, w66, w46, and w44 of the prediction pixels p64, p66, p46, and p44, which are nearest from the noticed pixel are set to a certain value. The prediction coefficients w53, w75, w57, and w35 of the prediction pixels p53, p75, p57, and p35, which are farther from the noticed pixel are set to a lower value than the former. The prediction coefficients can be set for the second group and the third group in the same manner.

When any one of the prediction pixels is a defective pixel, if a correction value of the noticed pixel, which is also a defective pixel, is calculated using the prediction pixels, a correct correction value is hardly obtained. Thus, in the calculation processing in step S71, the processing for excluding the prediction pixels that are defective pixels from the prediction pixels is performed. This is achieved by multiplying the product of the prediction pixels pi and the prediction coefficient $w_i$ by the flag $f_i$, which is set to "0" if it is a defective pixel and is set to "1" if it is a normal pixel.

If the noticed pixel is not a defective pixel, and is a normal pixel, it is not necessary to correct the pixel value. Thus, if it is determined that the noticed pixel is not a defective pixel in step S63, the processing from steps S64 to S71 is skipped.

After that in step S72, the calculation section 105 determines whether all the pixels have been processed. If there is a pixel that has not been processed, the processing returns to step S61, and the subsequent processing is repeated. If it is determined that all the pixels have been processed, the processing is terminated.

In this embodiment, the prediction pixels are set from the pixels in a certain wide range of pixels, namely 9×9 pixels centered around the noticed pixel extending in two dimensions. Accordingly, if not only the noticed pixel p55, but also the pixels in the same horizontal line p51, p53, p57, and p59 are defective pixels, it is possible to calculate the correction value of the noticed pixel p55. Also, when defective pixels arise in block state, if the range is within 9×9 pixels, it is possible to reliably calculate the correction value P55 of the noticed pixel.

Figure 7:
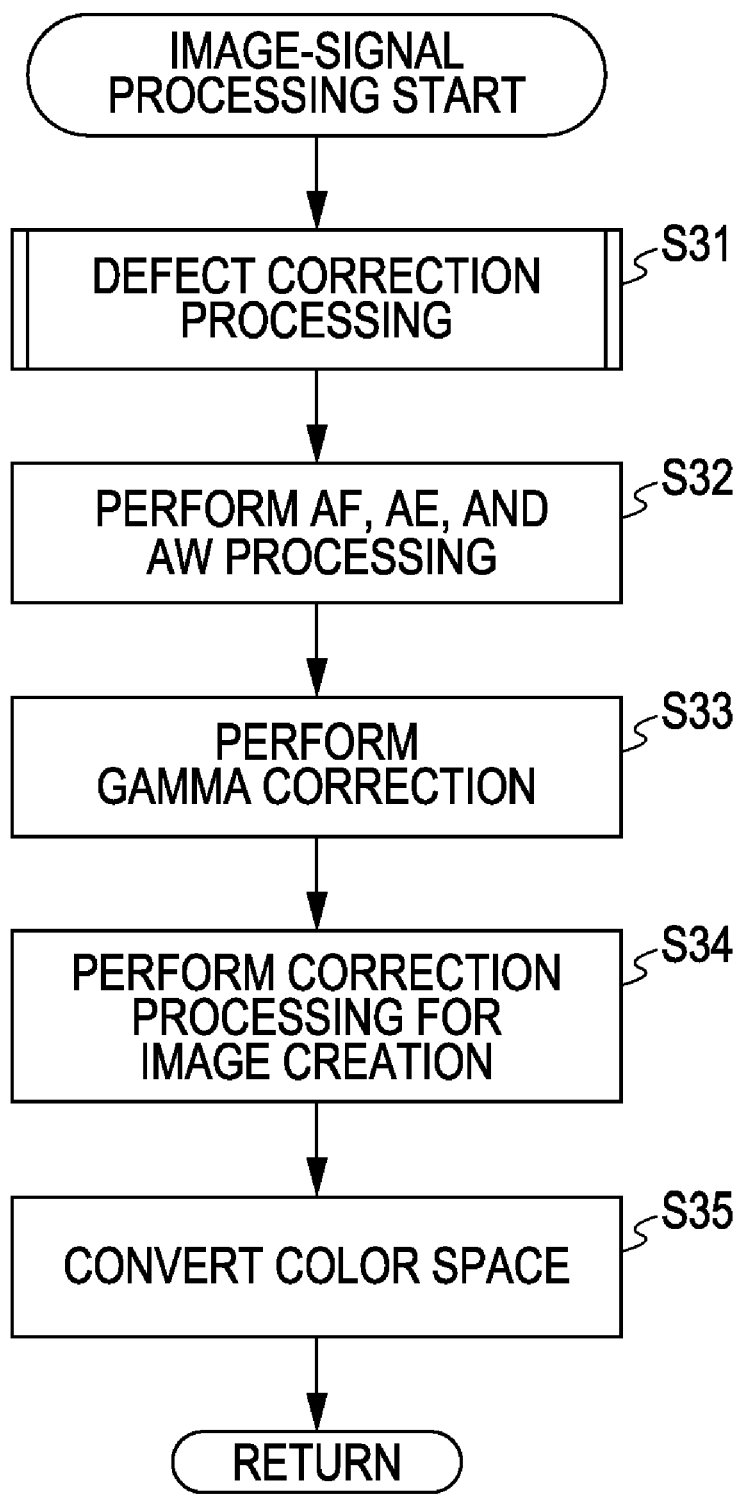
FIG. 7 is a flowchart illustrating image-signal processing.
Figure 16:
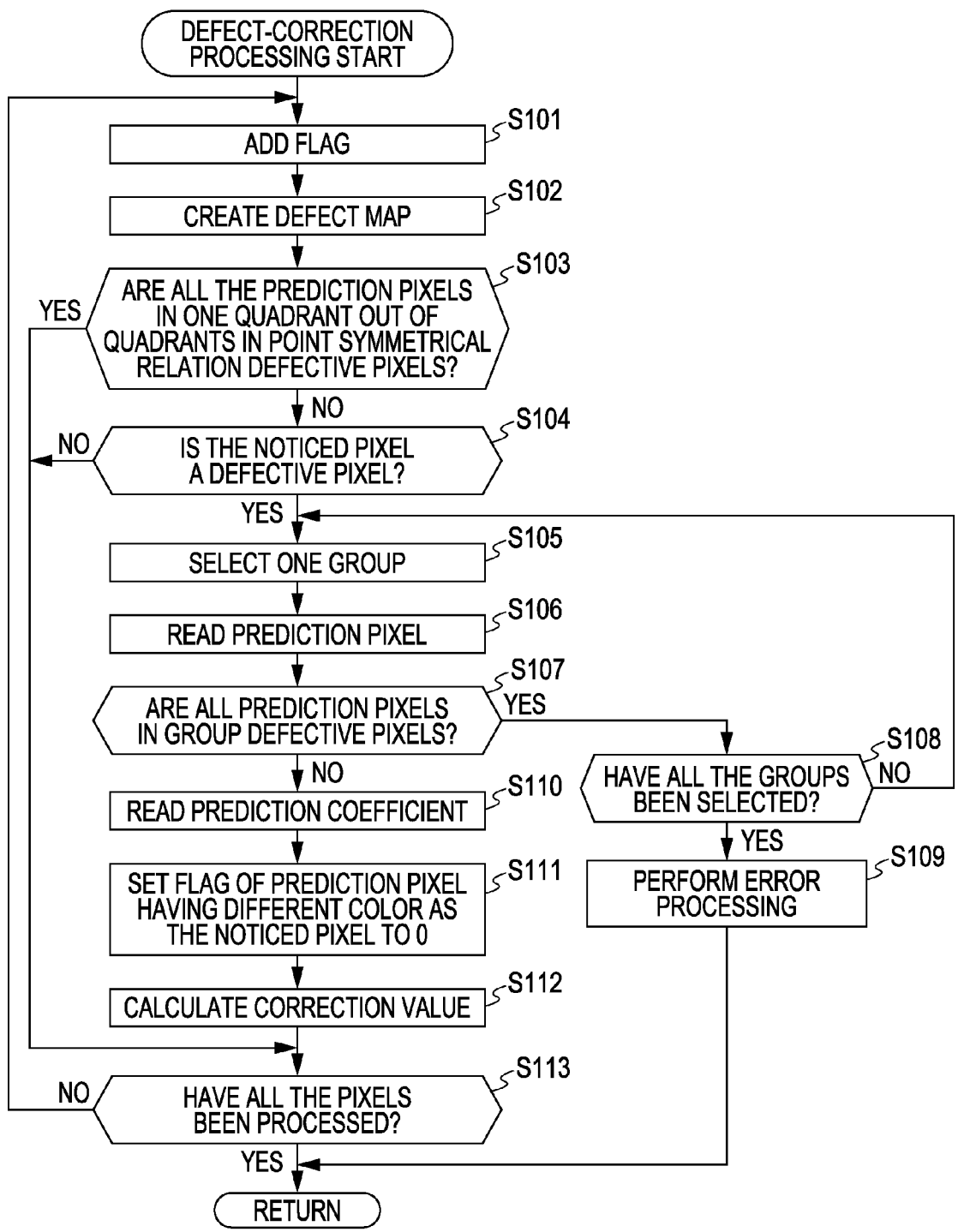
FIG. 16 is a flowchart illustrating defect-correction processing.

FIG. 16 shows another embodiment of the defect correction processing of the step 31 in FIG. 7. The defect correction processing of the steps 101 to 113 in FIG. 16 is basically the same processing as the processing of the steps S61 to S72 in FIG. 10. However, the different point is that step S103 is inserted between step S102 and step S104, which correspond to step S62 and step S63 in FIG. 10.

That is to say, in this embodiment, after the processing for adding a flag is performed in step S101, and the processing for creating a defect map is performed in step S102, in step S103, the calculation section 105 determines whether the prediction pixels in one quadrant out of the quadrants in point symmetrical relation are all defective pixels.

Figure 17:
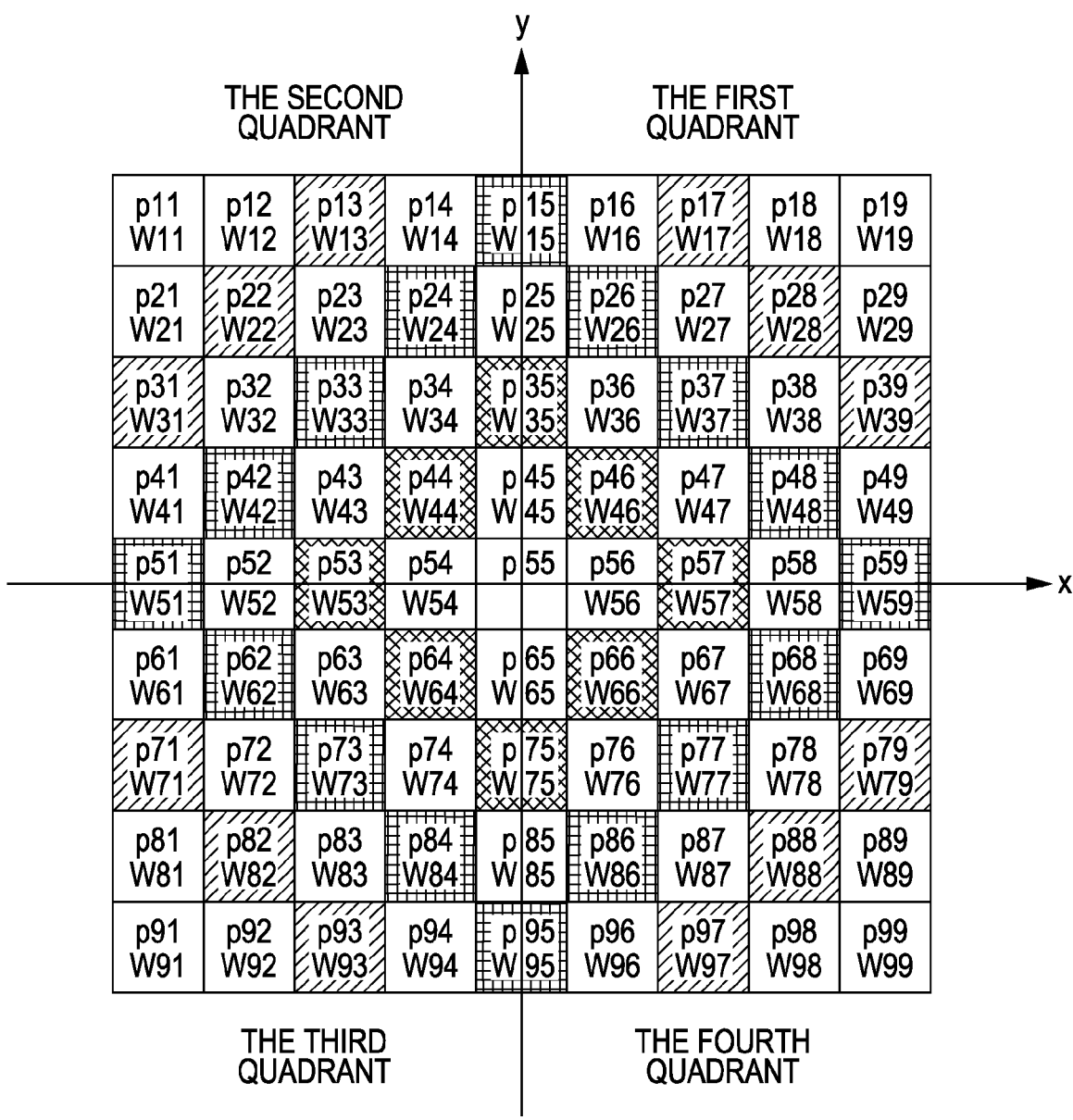
FIG. 17 is a diagram illustrating the quadrants of prediction pixels.

In this embodiment, as shown in FIG. 17, the area of 9×9 pixels is divided into four quadrants on the basis of the horizontal-direction axis (x-axis) and the vertical-direction axis (y-axis) including the noticed pixel p55. The area to which the upper right pixels P17, P26, P28, P37, P39, P46, and P48 of the noticed pixel belong is the first quadrant. The area to which the upper left pixels P13, P22, P24, P31, P33, P42, and P44 of the noticed pixel belong is the second quadrant. The area to which the lower left pixels P62, P64, P71, P73, P82, P84, and P93 of the noticed pixel belong is the third quadrant. The area to which the lower right pixels P66, P68, P77, P79, P86, P88, and P97 of the noticed pixel belong is the fourth quadrant. Among these, the quadrants in point symmetrical relation are the first quadrant and the third quadrant, and the second quadrant and the fourth quadrant.

When all the prediction pixels in one quadrant out of the quadrants in point symmetrical relation are not defective pixels, that is to say, when there is at least one normal pixel in each of the first quadrant and the third quadrant, or when there is at least one normal pixel in each of the second quadrant and the fourth quadrant, the processing from step S104 to S113 is performed. That is to say, in this case, the same processing as the processing in FIG. 10 is performed.

In contrast, when the prediction pixels of at least one of the first quadrant and the third quadrant are all defective pixels, or when the prediction pixels of at least one of the second quadrant and the fourth quadrant are all defective pixels, for example when the first-quadrant prediction pixels P17, P26, P28, P37, P39, P46, and P48 are all defective pixels, or when the second-quadrant prediction pixels P13, P22, P24, P31, P33, P42, and P44 are all defective pixels, the processing from S104 to S112 is skipped, the calculation of the correction value is not performed, and the processing subsequent step S113 is performed. That is to say, if the correction value is calculated in such a case, the calculation is performed on the basis of biased prediction pixels, and thus the correction value to be obtained may be biased. Thus, in such a case, the calculation of the correction value is not performed. The other processing is the same as the case of the processing in FIG. 10, and thus the description thereof is omitted.

In this regard, in the above, the pixels in the predetermined position is used for the prediction pixels out of 9×9 pieces. However, the values of the prediction pixels and the prediction coefficients may be changed in accordance with the mode selected by the user. For the image sensor 13, a CMOS image sensor is used. However, a CCD image sensor can be used. Also, a description has been given of the case where the present invention is applied to a digital camera. However, the present invention can be applied to a video camera, and to the other image processing apparatuses.

FIG. 18 is a block diagram illustrating an example of the configuration of a personal computer for executing the above-described series of processing by a program. A CPU (Central Processing Unit) 221 executes various kinds of processing in accordance with the programs stored in a ROM (Read Only Memory) 222 or a storage section 228. A RAM (Random Access Memory) 223 appropriately stores programs to be executed by the CPU 221, data, etc. The CPU 221, the ROM 222, and the RAM 223 are mutually connected with a bus 224.

An input/output interface 225 is also connected to the CPU 221 through the bus 224. An input section 226 including a keyboard, a mouse, a microphone, etc., and an output section 227 including a display, a speaker, etc., are connected to the input/output interface 225. The CPU 221 executes various kinds of processing in accordance with instructions input from the input section 226. The CPU 221 outputs the result of the processing to the output section 227.

The storage section 228 connected to the input/output interface 225 includes, for example a hard disk, and stores the programs executed by the CPU 221 and various kinds of data. A communication section 229 communicates with external apparatuses through a network such as the Internet, a local area network, etc. Also, the programs may be obtained through the communication section 229 to be stored into the storage section 228.

When a removable medium 231, such as a magnetic disk, an optical disc, a magneto-optical disc, or a semiconductor memory, etc., is attached, a drive 230 connected to the input/output interface 225 drives the medium, and obtains the program and the data recorded there. The obtained program and data are transferred to the storage section 228 as necessary, and is stored there.

When the series of processing is executed by software, the programs constituting the software are built in a dedicated hardware of a computer. Alternatively, the various programs are installed, for example in a general-purpose personal computer capable of executing various functions from a program recording medium.

The program recording medium for storing the programs, which are installed in a computer and is executable by the computer, includes, as shown in FIG. 18, a removable medium 231 which is a package medium including, such as a magnetic disk (including a flexible disk), an optical disc (including a CDROM (Compact Disc-Read Only Memory) and a DVD (Digital Versatile Disc)), a magneto-optical disc, or a semiconductor memory, etc. Alternatively, the program recording medium includes a ROM 222 for storing the programs temporarily or permanently, a hard disk constituting the storage section 228, etc. The storage of the programs into the program recording medium is carried out through the communication section 229, which is an interface, such as a router, a modem, etc., as necessary, or using a wired or wireless communication medium, such as a local area network, the Internet, a digital satellite broadcasting, etc.

In this regard, in this specification, the steps describing the programs include the processing to be performed in time series in accordance with the described sequence as a matter of course. Also, the steps include the processing which is not necessarily executed in time series, but is executed in parallel or individually.

In this regard, an embodiment of the present invention is not limited to the embodiments described above, and various modifications are possible without departing from the spirit and scope of the present invention.

What is claimed is:

1. An image processing apparatus comprising:
   imaging means for capturing an image using a sensor with pixels and generating a digital representation thereof in the form of image data;
   a memory in which is stored defective pixel information identifying defective pixels in the sensor; and
   a processing system configured to communicate with the imaging means and the memory and to process the image data and correct the image data for defective pixels,
   wherein the processing system includes
      an array storage section in which at least some of the image data are stored, including noticed pixel image data corresponding to a noticed pixel,
      a defective-position section into which data from the memory are stored at a predetermined time,
      a relating section configured to correlate image data in the array storage section with the data in the defective-position section,
      a reading section in communication with the array storage section and configured to identify prediction pixel image data corresponding to prediction pixels located at predetermined distances from the noticed pixel,
      a prediction-coefficient storage section in which are stored prediction coefficients corresponding to the prediction pixels, and
      a calculation section in communication with the prediction-coefficient section and the reading section and configured to calculate a correction value for the noticed pixel image data using the sum of the products of the prediction pixel image data and their prediction coefficients,
   and wherein
      the processing system groups the prediction pixels into a plurality of groups in accordance with their predetermined distances from the noticed pixel, and the calculation section calculates the correction value using the prediction pixel image data for prediction pixels in a group nearest the noticed pixel which are not all defective pixels.

2. The image processing apparatus according to claim 1, wherein:
   the relating section flags image data in the array storage section corresponding to defective pixels with a flag indicating whether or not to be a target of the calculation of the correction value for the noticed pixel, and
   processing system stores image data corresponding to a predetermined number of lines of pixels related to a predetermined number of the flags.

3. The image processing apparatus according to claim 2, wherein the calculation section calculates the correction value for the noticed pixel by further calculating the sum of the products of the flags with respect to the prediction pixels and the prediction coefficients.

4. The image processing apparatus according to claim 3, wherein the processing system is configured such that the flag of prediction pixel image data corresponding to a defective pixel is excluded from the correction value calculation.

5. The image processing apparatus according to claim 4, wherein the processing system is configured such that when the prediction pixel image data corresponds to a pixel of color different than that of the noticed pixel, the flag of that prediction pixel is excluded as a target of the correction value calculation.

6. A method of processing image data to compensate for a defective pixel in an image sensor, said method comprising the steps of:

receiving into a processing system image data generated by the image sensor;

identifying with the processing system noticed pixel image data relating to a noticed pixel;

storing in an array storage section image data relating to a plurality of pixels within a certain distance of the noticed pixel;

identifying with the processing system the image data in the array storage section which relate to defective pixels in the sensor;

when the noticed pixel is a defective pixel, obtaining prediction pixel image data relating to prediction pixels located at relative positions predetermined with respect to the noticed pixel, including dividing the prediction pixels into a plurality of groups in accordance with a distance from the noticed pixel;

supplying prediction coefficients corresponding to the prediction pixels; and calculating a correction value for the noticed pixel using the sum of the products of the prediction pixel image data and their prediction coefficients, including calculating the correction value using the prediction pixel image data for prediction pixels in a group near the noticed pixel, and when the prediction pixels in a group near the noticed pixel are all the defective pixels, calculating the correction value using the prediction pixel image data for prediction pixels in a group farther from the noticed pixel.

7. A non-transitory computer readable medium on which is stored a computer program for controlling an image processing apparatus including (a) imaging means for capturing an image in the form of image data, and (b) a processing section including an array storage section and a memory in which is stored defective-position data identifying a position of a defective pixel of the imaging means, the computer program comprising the steps of:

receiving into a processing system image data generated by the image sensor;

identifying as a noticed pixel image data relating to a noticed pixel;

storing in an array storage section image data relating to a plurality of pixels within a certain distance of the noticed pixel;

identifying the image data in the array storage section which relate to defective pixels in the sensor;

when the noticed pixel is a defective pixel, obtaining prediction pixel image data relating to prediction pixels located at relative positions predetermined with respect to the noticed pixel, including dividing the prediction pixels into a plurality of groups in accordance with a distance from the noticed pixel;

supplying prediction coefficients corresponding to the prediction pixels; and calculating a correction value for the noticed pixel using the sum of the products of the prediction pixel image data and their prediction coefficients, including calculating the correction value using the prediction pixel image data for prediction pixels in a group near the noticed pixel, and when the prediction pixels in a group near the noticed pixel are all the defective pixels, calculating the correction value using the prediction pixel image data for prediction pixels in a group farther from the noticed pixel.

8. An image processing apparatus comprising:

imaging means for capturing an image of an object of shooting;

defective-position storing means for storing a position of a defective pixel of the imaging means;

arraying means for arraying a plurality of pixels in a certain range of the vicinity of a noticed pixel of the image of the object of shooting output by the imaging means;

prediction-pixel obtaining means for obtaining prediction pixels located at relative positions predetermined with respect to the noticed pixel to be used for correcting the defective pixel out of the arrayed pixels when the noticed pixel is the defective pixel;

prediction-coefficient supplying means for supplying prediction coefficients corresponding to the prediction pixels; and calculation means for calculating a correction value of the noticed pixel using the sum of the products of the prediction pixels and the prediction coefficients, wherein, when all the prediction pixels of at least one quadrant of two quadrants in point symmetrical relation out of four quadrants based on the noticed pixel are the defective pixels, the calculation means does not calculate the correction value.

9. An image processing apparatus comprising:

imaging means for capturing an image of an object of shooting;

defective-position storing means for storing a position of a defective pixel of the imaging means;

arraying means for arraying a plurality of pixels in a certain range of the vicinity of a noticed pixel of the image of the object of shooting output by the imaging means;

prediction-pixel obtaining means for obtaining prediction pixels located at relative positions predetermined with respect to the noticed pixel and to be used for correcting the defective pixel out of the arrayed pixels when the noticed pixel is the defective pixel;

prediction-coefficient supplying means for supplying prediction coefficients corresponding to the prediction pixels; and calculation means for calculating a correction value of the noticed pixel using the sum of the products of the prediction pixels and the prediction coefficients, wherein, the prediction pixels are divided into a plurality of groups in accordance with a distance from the noticed pixel, the calculation means calculates the correction value using the prediction pixels in a group near the noticed pixel, and when the prediction pixels in a group near the noticed pixel are all the defective pixels, the calculation means calculates the correction value using the prediction pixels in a group farther from the noticed pixel.

10. An image processing apparatus comprising:

imaging means for capturing an image using a sensor with pixels and generating a digital representation thereof in the form of image data;

a memory in which is stored defective pixel information identifying defective pixels in the sensor; and a processing system configured to communicate with the imaging means and the memory and to process the image data and correct the image data for defective pixels, wherein the processing system includes
- an array storage section in which at least some of the image data are stored, including noticed pixel image data corresponding to a noticed pixel,
- a defective-position section into which data from the memory are stored at a predetermined time,
- a relating section configured to correlate image data in the array storage section with the data in the defective-position section,
- a reading section in communication with the array storage section and configured to identify prediction pixel image data corresponding to prediction pixels located at predetermined distances from the noticed pixel,
- a prediction-coefficient storage section in which are stored prediction coefficients corresponding to the prediction pixels, and
- a calculation section in communication with the prediction-coefficient section and the reading section and configured to calculate a correction value for the noticed pixel image data using the sum of the products of the prediction pixel image data and their prediction coefficients, and wherein,
- considering the image data in the array storage section as corresponding to pixels in a two-dimensional array subdivided into four quadrants, the processing system is configured such that when all the prediction pixels of at least one quadrant of two quadrants in point symmetrical relation out of the four quadrants based on the noticed pixel are defective pixels, the calculation section does not calculate the correction value.

* * * * *